(12) United States Patent
Sultan et al.

(10) Patent No.: US 7,131,766 B2
(45) Date of Patent: Nov. 7, 2006

(54) TEMPERATURE SENSOR APPARATUS AND METHOD

(75) Inventors: Michel F. Sultan, Troy, MI (US);
Charles R. Harrington, Troy, MI (US);
Da Yu Wang, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 25 days.

(21) Appl. No.: 10/621,140

(22) Filed: Jul. 16, 2003

(65) Prior Publication Data
US 2005/0012588 A1   Jan. 20, 2005

(51) Int. Cl.
*G01K 17/08* (2006.01)
*G01K 3/08* (2006.01)
*G01K 7/16* (2006.01)
*G01J 5/20* (2006.01)

(52) U.S. Cl. ............... 374/29; 374/135; 374/163; 250/338.1

(58) Field of Classification Search ............... 374/29, 374/1, 163; 250/338.1
See application file for complete search history.

(56) References Cited

U.S. PATENT DOCUMENTS

| | | | | |
|---|---|---|---|---|
| 4,542,650 | A * | 9/1985 | Renken et al. | 73/196 |
| 5,108,193 | A * | 4/1992 | Furubayashi | 374/164 |
| 5,177,696 | A * | 1/1993 | Bonne | 702/136 |
| 5,178,464 | A * | 1/1993 | Fraden | 374/129 |
| 5,295,389 | A * | 3/1994 | Nagata et al. | 73/25.03 |
| 5,823,680 | A * | 10/1998 | Kato et al. | 374/185 |
| 5,936,157 | A * | 8/1999 | Yamashita et al. | 73/204.26 |
| 6,131,453 | A | 10/2000 | Sultan et al. | |
| 6,238,085 | B1 * | 5/2001 | Higashi et al. | 374/10 |
| 6,329,825 | B1 * | 12/2001 | Tanaka et al. | 324/725 |
| 6,536,274 | B1 * | 3/2003 | Zushi et al. | 73/204.26 |
| 6,557,411 | B1 * | 5/2003 | Yamada et al. | 73/204.26 |
| 6,588,931 | B1 | 7/2003 | Betzner et al. | |
| 6,593,519 | B1 * | 7/2003 | Kubo | 136/224 |
| 6,612,736 | B1 | 9/2003 | Lee et al. | |
| 6,631,638 | B1 * | 10/2003 | James et al. | 73/204.26 |
| 6,921,195 | B1 * | 7/2005 | Pipe et al. | 374/43 |
| 6,973,826 | B1 * | 12/2005 | Matsumoto et al. | 73/204.15 |
| 7,003,418 | B1 * | 2/2006 | Bonne et al. | 702/100 |
| 7,005,643 | B1 * | 2/2006 | Hamamoto | 250/338.1 |
| 2002/0037026 | A1 * | 3/2002 | Sato et al. | 374/132 |
| 2004/0112663 | A1 * | 6/2004 | Kocher et al. | 180/274 |

* cited by examiner

*Primary Examiner*—Gail Verbitsky
(74) *Attorney, Agent, or Firm*—Paul L. Marshall

(57) ABSTRACT

A temperature sensor includes a membrane supported by a substrate and a circuit having elements for a substrate electrical resistance indicative of the temperature of a substrate and a membrane electrical resistance indicative of the temperature of a membrane. The substrate resistance and the membrane resistance are arranged in a bridge configuration to facilitate measurement of a differential voltage responsive to temperature change. The resulting temperature signal includes a first varying portion and a second varying portion. A controller receives a temperature signal from sensor, eliminates the second varying portion and generates a temperature value based on the based on the first varying portion. In this manner, the sensor provides an improved, fast response to changes in the surrounding temperature.

17 Claims, 3 Drawing Sheets

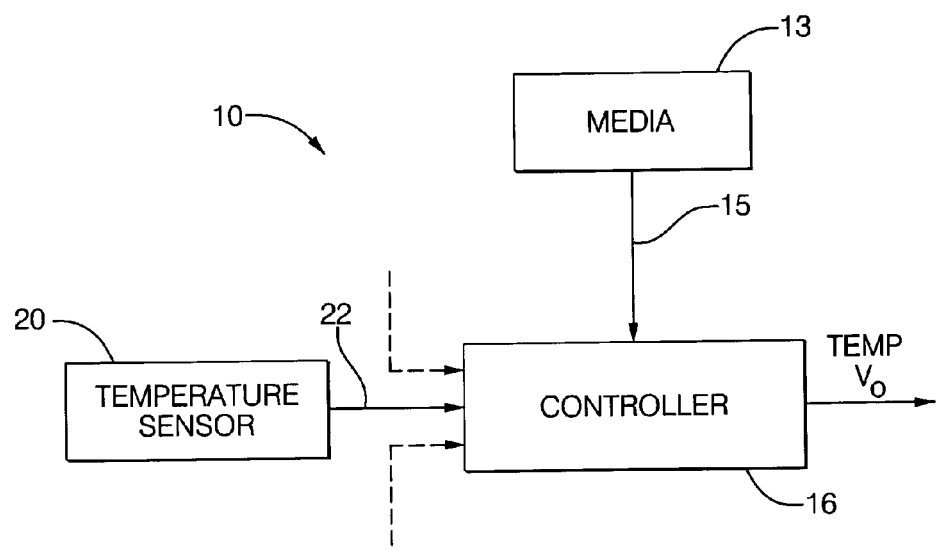
FIG. 1
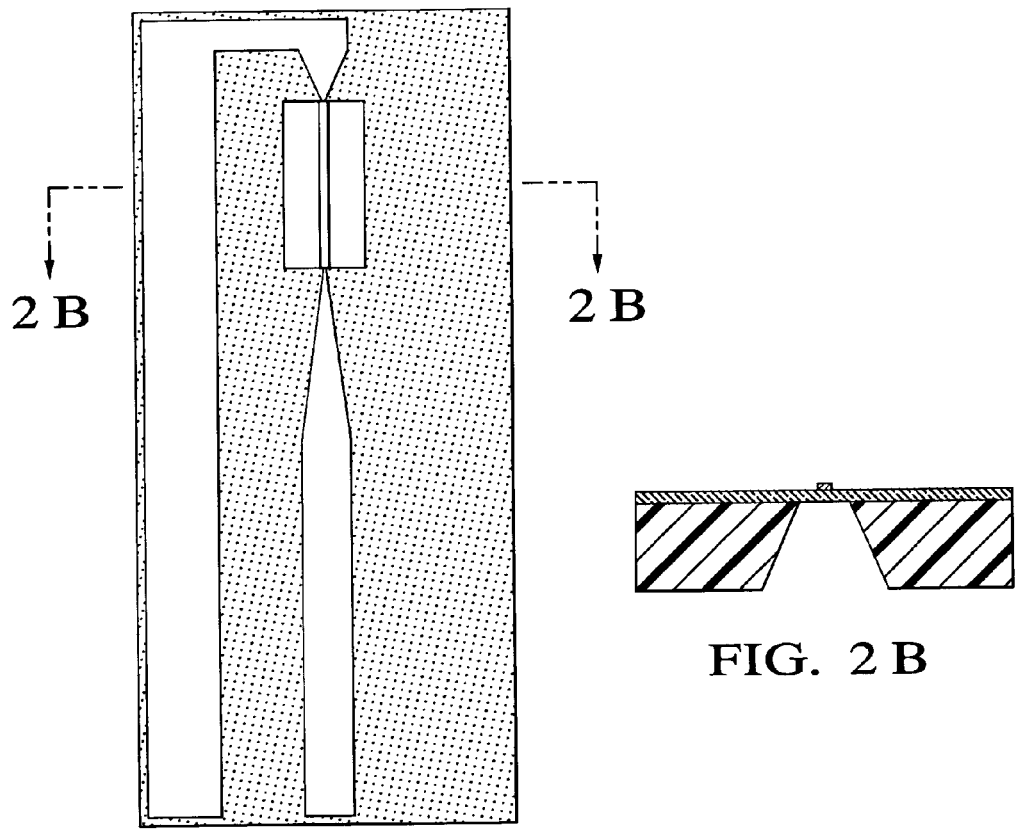
FIG. 2A
FIG. 2B

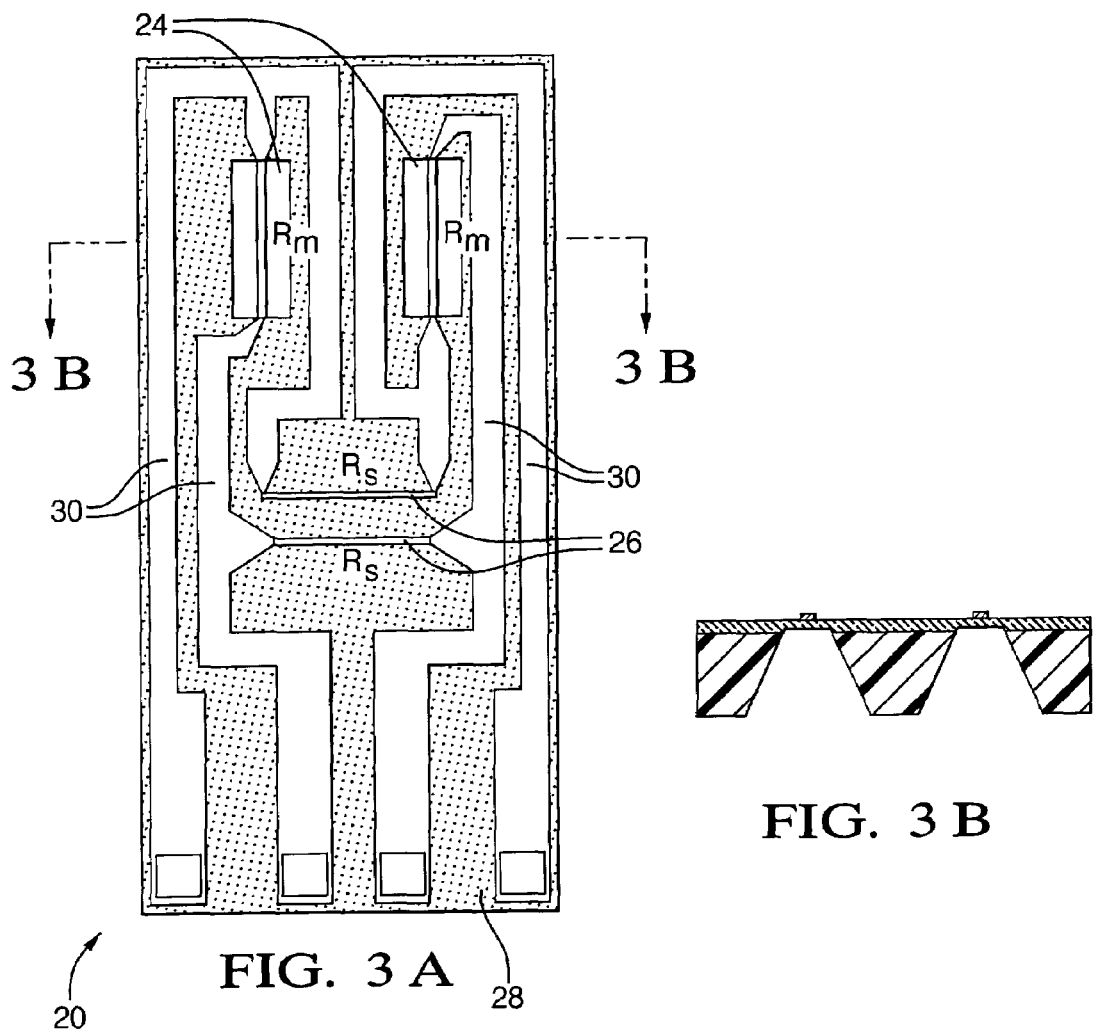
FIG. 3 A
FIG. 3 B
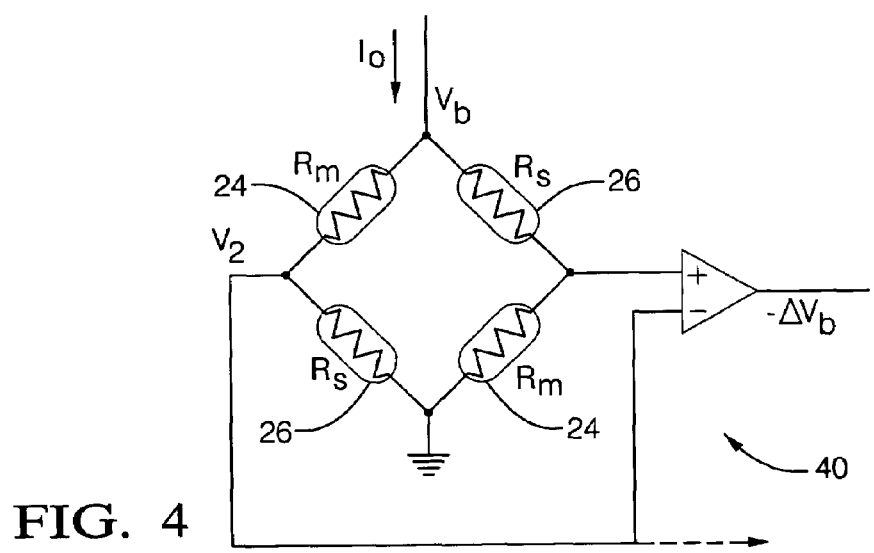
FIG. 4

TEMPERATURE SENSOR APPARATUS AND METHOD

BACKGROUND

This invention relates to a temperature sensor bridge apparatus and an algorithm for processing signals therefrom. Temperature sensors with fast response-time are desirable for a number of applications. A conventional approach for fast temperature sensing a micromachined MEMS device with a low thermal mass membrane where the temperature detector is located. The detector typically responds very quickly during the initial phase of a thermal event, followed by a much slower phase that is representative of the slower dynamics of the bulk of the silicon device. Unfortunately, the slower response due to the bulk of the silicon impedes detection of the faster dynamics.

Therefore, it would be beneficial to provide an approach whereby the fast response component is detected and extracted through a novel use of a temperature detector bridge and associated electronics.

BRIEF SUMMARY

Disclosed herein is a temperature sensor comprising: a first substrate resistance configured to be primarily responsive to a temperature of a substrate; a first membrane resistance configured to be primarily responsive to a temperature of a membrane; and wherein the first substrate resistance and the first membrane resistance are arranged in a series circuit configured to facilitate measurement of a voltage across each responsive to a temperature change.

Also disclosed herein is a system for determining a temperature comprising: a temperature sensor comprising: a first substrate resistance configured to be primarily responsive to a temperature of a substrate; and a first membrane resistance configured to be primarily responsive to a temperature of a membrane. The first substrate resistance and the first membrane resistance are arranged in a series circuit configured to facilitate measurement of a voltage across each responsive to a temperature change. The system also includes a controller in operable communication with the temperature sensor, the controller configured to receive and condition a signal indicative of a temperature.

Further disclosed herein is a method of determining a temperature comprising: receiving a temperature signal, the temperature signal indicative of a composite temperature variation including a first varying portion and a second varying portion; configuring the temperature signal to eliminate the second varying portion; and generating a temperature value based on the configuring wherein the temperature value is substantially based on the first varying portion.

Also disclosed herein, in yet another embodiment, is a system for determining a temperature. The system comprising: a means for receiving a temperature signal, the temperature signal indicative of a composite temperature variation including a fast varying portion and a slowly varying portion; a means for configuring the temperature signal to eliminate the slowly varying portion; and a means for generating a temperature value based on the configuring wherein the temperature value is substantially based on the fast varying portion.

BRIEF DESCRIPTION OF THE DRAWINGS

The present invention will now be described, by way of an example, with references to the accompanying drawings, wherein like elements are numbered alike in the several figures in which:

FIG. 1 depicts a simplified block diagram for employing an implementation of an exemplary embodiment;

FIG. 2A is a diagram depicting an implementation of a temperature sensor;

FIG. 2B is a selected cross sectional view of the sensor of FIG. 2A depicting an implementation of a temperature sensor;

FIG. 3A is a diagram depicting an implementation of a temperature sensor in accordance with an exemplary embodiment;

FIG. 3B is a selected cross sectional view of the sensor of FIG. 3A depicting an implementation of a temperature sensor in accordance with an exemplary embodiment;

FIG. 4 is a simplified schematic diagram depicting a bridge amplifier network utilizing an exemplary temperature sensor in accordance with an exemplary embodiment;

DESCRIPTION OF AN EXEMPLARY EMBODIMENT

Figure 5:
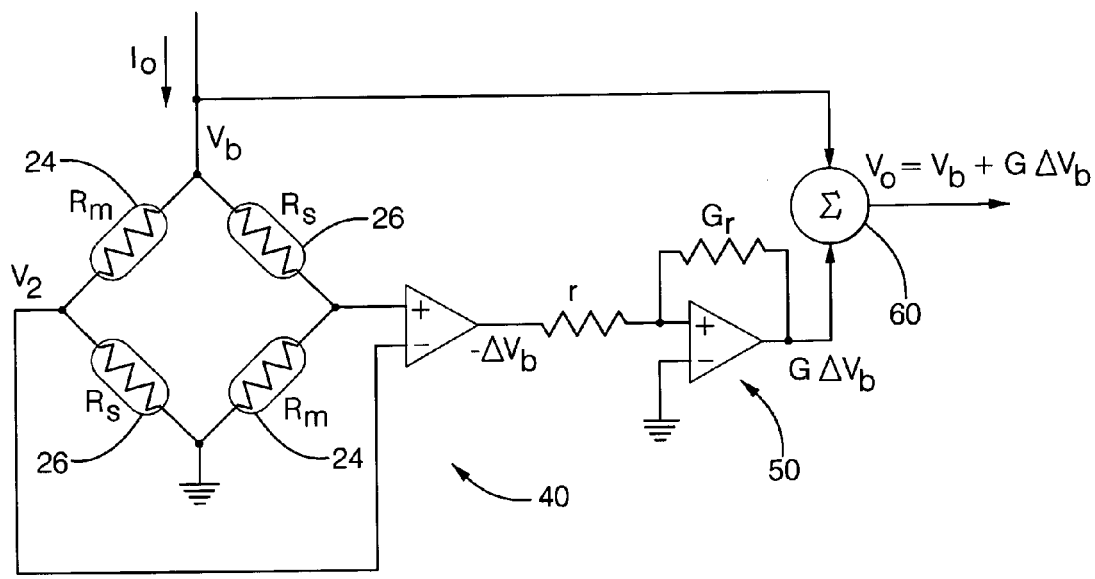
FIG. 5 is simplified schematic diagram depicting a bridge amplifier network utilizing an exemplary temperature sensor in accordance with an exemplary embodiment.

Temperature sensors with fast response-time are desirable for a number of applications including, but not limited to automotive engine control and emission control. A conventional approach for fast temperature sensing includes a micro-electro-mechanical systems (MEMS) device. A low thermal mass membrane includes the temperature detector. The detector typically responds very quickly during the initial phase of a thermal event, followed by a much slower phase that is representative of the slower dynamics associated with the bulk of the silicon device. Disclosed herein in an exemplary embodiment is an apparatus and methodology whereby the fast response component is extracted utilizing a temperature detector bridge and associated electronics.

Referring to FIG. 1, reference numeral 10 generally designates a control system suitable for implementation of the disclosed embodiments. It should be noted that although the disclosed embodiments may be described by way of reference to temperature sensors for engine and emission control applications, it will be appreciated that such references are illustrative only and the disclosed embodiments may be applied to any instance where temperature sensing is desired The temperature sensor 20 transmits temperature signal(s) 22 to controller 16 for processing in accordance with an exemplary embodiment. Controller 16 executes a processing algorithm performing a methodology 100 (See FIG. 5) for processing the temperature signal(s) 22. Preferably, the sensing electronics associated with the temperature sensor 20 are configured integral with the temperature sensor 20 or controller 16. Advantageously, this approach further reduces cost and simplifies the interface electronics. Further details of the algorithm 100 may be found at a later point herein.

The temperature signal 22, among others, is applied to the controller 16. The controller 16 processes all input signals to generate values corresponding to each of the signals resulting in a temperature value being made available for processing in various algorithms as prescribed herein. Measurement signals, such as the abovementioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the temperature sensor signal processing, control algorithm(s), and the like), controller 16 may include, but not be limited to, a processor(s), computer(s), DSP(s), memory, storage, register(s), timing, interrupt(s), communication interface(s), and input/output signal(s) interfaces, and the like, as well as combinations comprising at least one of the foregoing. Moreover, controller 16 may include or be implemented with various processors, controllers, microcontrollers, logic/gate arrays, programmable logic arrays (PLA), programmable logic devices, and the like, as well as combinations including any of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As exemplified herein and disclosed above one such process may be determining a temperature value from temperature signal(s) 22. Controller 16 receives various input signals including, but not limited to, those identified above, to facilitate such processing and may provide one or more output signals in response. Also received by the controller 16 are a variety of implementation specific parameters, signals and values for initialization and characterization of the prescribed processes and to identify various states of the processes herein.

Continuing now with FIGS. 2A and 2B as well, a simple MEMS temperature sensor is shown generally employing a membrane with a resistance exhibiting a high thermal coefficient on a silicon substrate. Two lead traces with low resistance for interconnection are also depicted. Turning now to FIGS. 3A and 3B, a MEMS temperature sensor 20 in accordance with an exemplary embodiment is depicted. A membrane with a resistance 24, also exhibiting a high thermal coefficient denoted $R_m$, is depicted. In addition, another resistance 26 also denoted $R_s$, in this instance mounted primarily on a silicon substrate 28 is depicted. A plurality of traces 30, which facilitate interconnection are also depicted. It will be appreciated that in an exemplary embodiment two membrane resistances, $R_m$ 24 and two substrate resistances, $R_s$ 26, are employed to facilitate implementation with a Wheatstone bridge circuit. It will be appreciated that the exemplary embodiments as disclosed herein are equally applicable employing a plurality of resistances as the membrane resistances, $R_m$ 24 and substrate resistances, $R_s$ 26, or even a single membrane resistance, $R_m$ 24 and a single substrate resistance $R_s$ 26. Implementations with other resistance configurations would, of course, require varied electrical circuit interfaces.

A basic understanding of the mathematical background will be beneficial for appreciation of the exemplary embodiments as disclosed herein. Let $R_m$ and $R_s$ be the resistances of two thin film temperature detectors, the first one on a thin, low thermal mass membrane 24, and the second one on a high thermal mass silicon substrate 26. Preferably, but not necessarily, these resistors are made of the same material that exhibits a high temperature coefficient of resistance. In an exemplary embodiment, a temperature coefficient of resistance in excess of 3000 parts per million (ppm) was employed. However, a temperature coefficient of resistance in excess in excess of about 1200–1500 parts per million (ppm) is satisfactory.

Let the two resistances be equal when stabilized at an ambient temperature $T_a$:

$$R_m(T_a)=R_s(T_a)=R_a \quad (1)$$

When subjected to a temperature step $\Delta T$, the two resistances $R_m$ and $R_s$ increase with different dynamic responses, with the resistance of the detector on the membrane $R_m$ reaching its final value at a faster rate than the detector on bulk silicon $R_s$. The final values at temperature $T=T_a+\Delta T$ are:

$$R_m(T)=R_s(T)=R_a+\Delta R \quad (2)$$

where $$\Delta R=R_a(1+c\,\Delta T) \quad (3)$$

where "c" is the temperature coefficient of resistance for the material.

Let the response-time of the temperature detector on a "free-standing", thermally isolated membrane, $R_m$ 24 be $\tau_f$, and the response-time of the temperature detector on a bulk silicon device $R_s$ 26 be $\tau_s$. Both time constants $\tau_f$ and $\tau_s$ depend significantly on the geometrical design as well as the material thermal properties of the membrane and the bulk silicon device. For a practical configuration though, it will be appreciated that the membrane cannot be entirely free-standing. Often, it is part of a silicon device as illustrated in FIG. 2, with physical and thermal anchoring to the surrounding bulk silicon 28. Although FIG. 3A shows a silicon substrate 28, other substrate materials may be suitable as well, including, but not limited to, ceramic or silicon carbide substrates.

For such a configuration, as the response of the detector is primarily a fast rising/varying portion representative of the membrane dynamics denoted as $\tau_f$, followed by a slowly varying response that is representative of the bulk silicon substrate dynamics $\tau_s$. It will be appreciated then, that a composite response-time depends primarily on the degree of thermal coupling between the membrane and the bulk silicon substrate. In an exemplary embodiment, a first varying response corresponding to the fast varying response may be on the order of milliseconds or tens of milliseconds, while a second varying response corresponding to the slowly varying response may be on the order of hundreds of milliseconds or seconds. Therefore, for a first approximation, the response-times of a detector on a practical membrane detector, $R_m$ 24 and a sensor on bulk silicon $R_s$ 26 are given by:

$$R_m(t)=R_a+\Delta R\{(1-\alpha)[1-\exp(-t/\tau_f)]+\alpha[1-\exp(-t/\tau_s)]\} \quad (4)$$

$$R_s(t)=R_a+\Delta R\,[1-\exp(-t/\tau_s)] \quad (5)$$

where "$\alpha$" is a coefficient that depends on the degree of thermal coupling between the membrane and the surrounding bulk silicon substrate. For a membrane with a very high level of thermal coupling, $\alpha\sim 1$, and for a membrane with very good thermal isolation, $\alpha\sim 0$. Therefore, for a practical situation in an actual physical implementation, $\alpha$ is between 1 and 0.

It will be appreciated that the slower response-time of the sensor on the silicon substrate, $\tau_s$ may be more than one or two orders of magnitude larger than the fast response-time $\tau_f$. Accordingly, for a fast response-time sensor e.g., membrane resistance 24, it is desirable to maximize the fast response component in equation (4). This may be achieved by increasing the isolation between the membrane and the bulk silicon 28. One possible means of increasing the isolation is by increasing the membrane area. However, a large membrane may not be desirable because it becomes more fragile and easily subject to fatigue and breakage, and it would therefore significantly reduce the durability of the device. Another methodology, such as that disclosed herein in an exemplary embodiment is to take advantage of the distinctions between the membrane response and the response due to the silicon substrate 28.

Disclosed herein in an exemplary embodiment is an approach where both types of detectors are used with corresponding processing to extract the fast response component from the total response. In an exemplary embodiment as depicted in FIGS. 3A and 3B, as well as FIGS. 4 and 5, two pairs of resistances $R_m$ 24 and $R_s$ 26 are employed in a configuration of a bridge as illustrated and shown generally as 40. The bridge voltage $V_b$ and the differential voltage $\alpha V_b$ respond differently to a temperature step $\Delta T$. As demonstrated later in this disclosure, these two signals may be combined in a novel and unique way to extract the fast response component, thereby resulting in a very fast response-time sensing scheme. Advantageously, employing four resistances in a bridge 40 configuration facilitates elimination of common errors and variations associated with the resistances $R_m$ 24 and $R_s$ 26. Moreover, the bridge configuration facilitates amplification of the differential voltage generated by the two legs of the bridge 40.

When the bridge 40 of FIG. 4 is excited with a constant bias current, denoted as $I_0$, it may be shown that the bridge voltage $V_b$ and the differential bridge voltage $\Delta V_b$ are given by the following equations:

$$V_b = 0.5 I_0 (R_m + R_s) \quad (6)$$

$$\Delta V_b = V_1 - V_2 = 0.5 I_0 (R_m - R_s) \quad (7)$$

The step responses of these two signals are obtained by replacing equations (4) and (5) in equations (6) and (7):

$$V_b(t) = I_0 R_a + 0.5 I_0 \Delta R \{(1-\alpha[1--\exp(-t/\tau_f)] + (1\alpha)[1-\exp(-t/\tau_s)]\} \quad (8)$$

$$\Delta V_b(t) = 0.5 I_0 \Delta R (1-\alpha) \{[1-\exp(-t/\tau_f)] - [1--\exp(-t/\tau_s)]\} \quad (9)$$

Through a linear combination of equations (8) and (9), it may be noted that it is possible to cancel out the slowly varying signal. Elimination of the slowly varying signal yields the fast responding signal as desired. One implementation to facilitate elimination of the slowly varying signal may be realized physically with an electronic circuit as illustrated in FIG. 5 that sums the bridge voltage $V_b$ and the differential voltage $\Delta V_b$ after the latter has been amplified through an amplifier 50 exhibiting a gain G. The resulting sensor output voltage $V_0$ of the summer 60 is given by:

$$V_0(t) = V_b(t) + G \Delta V_b(t) \quad (10)$$
$$= I_0 R_a + 0.5 \, I_0 \Delta R \{K_1[1 - \exp(-t/\tau_f)] + K_2[1 - \exp(-t/\tau_s)]\}$$

where $$K_1 = (1-\alpha)(1+G), \quad K_2 = [2-(1-\alpha)(1+G)] \quad (11)$$

It is now shown that with an appropriate value for the gain G, the slow varying term $K_2$ in equation (10) vanishes. The optimal value for the gain, $G_{opt}$, is:

$$G_{opt} = (1+\alpha)/(1-\alpha) \quad (12)$$

Using the optimal value for the gain, equation (10) reduces to:

$$V_{0opt}(t) = I_0 R_a + I_0 \Delta R [1-\exp(-t/\tau_f)] \quad (13)$$

It will be appreciated that the functionality depicted in FIG. 5 may also be readily computed with a processor such as with controller 16. In another exemplary embodiment, controller 16 optionally receives the voltages from the bridge 40 for computation in accordance with the teachings herein. It will be appreciated that controller 40 may also receive signals indicative of the voltages at nodes $V_1$ and $V_2$ in advance of the buffer depicted for internal computation of $\Delta V_b$.

Figure 6:
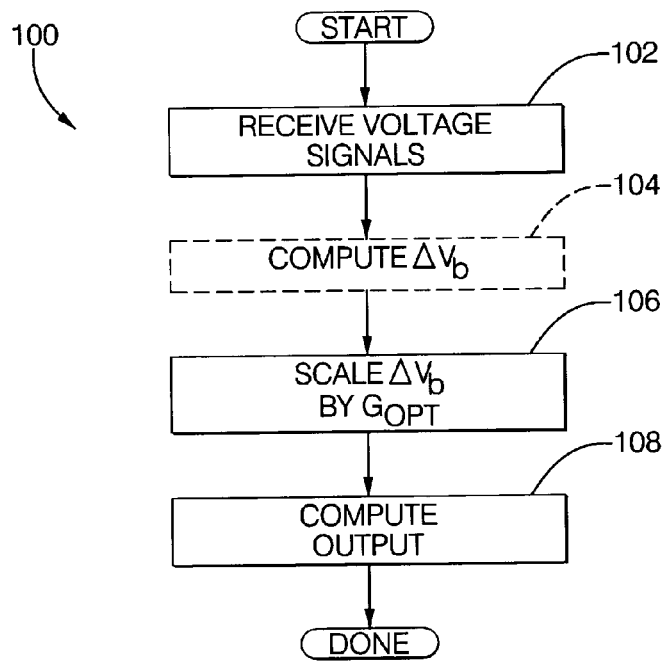
FIG. 6 is a block diagram depicting a flow chart of methodology in accordance with an exemplary embodiment.

Turning now to FIG. 6 as well, a flowchart depicting a methodology 100 in accordance with an exemplary embodiment is provided. At process block 102, the temperature signals 22 (FIG. 1) are received from the bridge 40 (e.g., temperature sensor 20). Optionally, a value for the voltage change for a given temperature change, $\Delta V_b$ is computed from values for the voltages on each leg of the bridge as depicted at optional process block 104. At process block 106, the value for $\Delta V_b$ is scaled by gain G, where G is preferably equal to $G_{opt}$ to facilitate elimination of the slowly varying portion of the signal. Finally, the optimal value $V_{0opt}(t)$ for the temperature including only the rapidly varying portion may readily be computed by summing the scaled value of $\Delta V_b$ with the bridge voltage $V_b$ in accordance with Equation 13 as depicted at process block 108.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code as a data signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A temperature sensor comprising:
a substrate;
a membrane supported by the substrate; and
an electrical circuit disposed on the sensor and configured to determine
a first substrate electrical resistance responsive to a temperature of the substrate;
a second substrate electrical resistance responsive to the temperature of the substrate;
a first membrane electrical resistance responsive to a temperature of the membrane;
a second membrane electrical resistance responsive to a temperature of the membrane; and
wherein said first substrate electrical resistance, said second substrate electrical resistance, said first membrane electrical resistance, and said second membrane electrical resistance are arranged in a bridge configuration to facilitate measurement of a differential voltage across each responsive to a temperature change.

2. The temperature sensor of claim 1 wherein at least one of said first substrate electrical resistance, said first membrane electrical resistance, said second substrate electrical resistance, and said second membrane electrical resistance exhibits a thermal coefficient of resistance in excess of about 1200 ppm.

3. The temperature sensor of claim 1 wherein at least one of said first substrate electrical resistance, said first membrane electrical resistance, said second substrate electrical resistance, and said second membrane electrical resistance exhibits a thermal coefficient of resistance in excess of about 1500 ppm.

4. The temperature sensor of claim 1 wherein said first substrate electrical resistance, said first membrane electrical resistance, said second substrate electrical resistance, and said second membrane electrical resistance are formulated with substantially equivalent materials.

5. The temperature sensor of claim 1 wherein at least one of said first substrate electrical resistance, said first membrane electrical resistance said second substrate electrical resistance, and said second membrane electrical resistance are formulated as part of a micro-electro-mechanical systems (MEMS) device.

6. The temperature sensor of claim 1 wherein at least one of said first substrate electrical resistance and said first membrane electrical resistance exhibits a thermal coefficient of resistance in excess of about 1200 ppm.

7. The temperature sensor of claim 5 wherein said first substrate electrical resistance and said first membrane electrical resistance is formulated as part of a micro-electronic machined device.

8. A system for determining a temperature comprising:
a temperature sensor comprising:
a substrate;
a membrane supported by the substrate; and
an electrical circuit disposed on the sensor and configured to determine
a first substrate electrical resistance and a second substrate electrical resistance responsive to a temperature of the substrate;
a first membrane electrical resistance responsive to a temperature of the membrane;
a second membrane electrical resistance configured to be responsive to a temperature of the membrane; and
wherein said first substrate electrical resistance, second substrate electrical resistance, said first electrical membrane resistance and said second membrane electrical resistance are arranged in a bridge configuration to facilitate measurement of a differential voltage across each responsive to a temperature change; and
a controller in operable communication with said temperature sensor, said controller configured to receive a temperature signal indicative of a temperature change.

9. The system of claim 8 wherein at least one of said first substrate electrical resistance, said first membrane electrical resistance, said second substrate electrical resistance, and said second membrane electrical resistance exhibits a thermal coefficient of resistance in excess of about 1200 ppm.

10. The system of claim 8 wherein at least one of said first substrate electrical resistance, said first membrane electrical resistance, said second substrate electrical resistance, and said second membrane electrical resistance exhibits a thermal coefficient of resistance in excess of about 1500 ppm.

11. The system of claim 8 wherein said first substrate electrical resistance, said first membrane electrical resistance, said second substrate electrical resistance, and said second membrane electrical resistance are formulated with substantially equivalent materials.

12. The system of claim 8 wherein at least one of said first substrate electrical resistance , said first membrane electrical resistance said second substrate electrical resistance, and said second membrane electrical resistance are formulated as part of a micro-electro-mechanical systems MEMS device.

13. The system of claim 8 wherein said first substrate electrical resistance and said first membrane electrical resistance is formulated as part of a micro-electro-mechanical systems MEMS device.

14. The system of claim 8 wherein said bridge configuration further includes an amplifier to buffer said differential voltage.

15. The system of claim 8 further including an amplifier and summer to facilitate scaling said differential voltage and extracting a first varying portion thereof.

16. The system of claim 15 wherein said first varying portion corresponds to variations of about 1 to 100 milliseconds.

17. The system of claim 8 wherein said controller includes at least one of: an amplifier to buffer said differential voltage; and an amplifier and summer to facilitate scaling said differential voltage and extracting a first varying portion thereof.

* * * * *